Jan. 11, 1927.
J. J. DONNELLY
1,613,873
VAPOR CONDENSER FOR MOTOR VEHICLE RADIATORS
Filed March 3, 1926
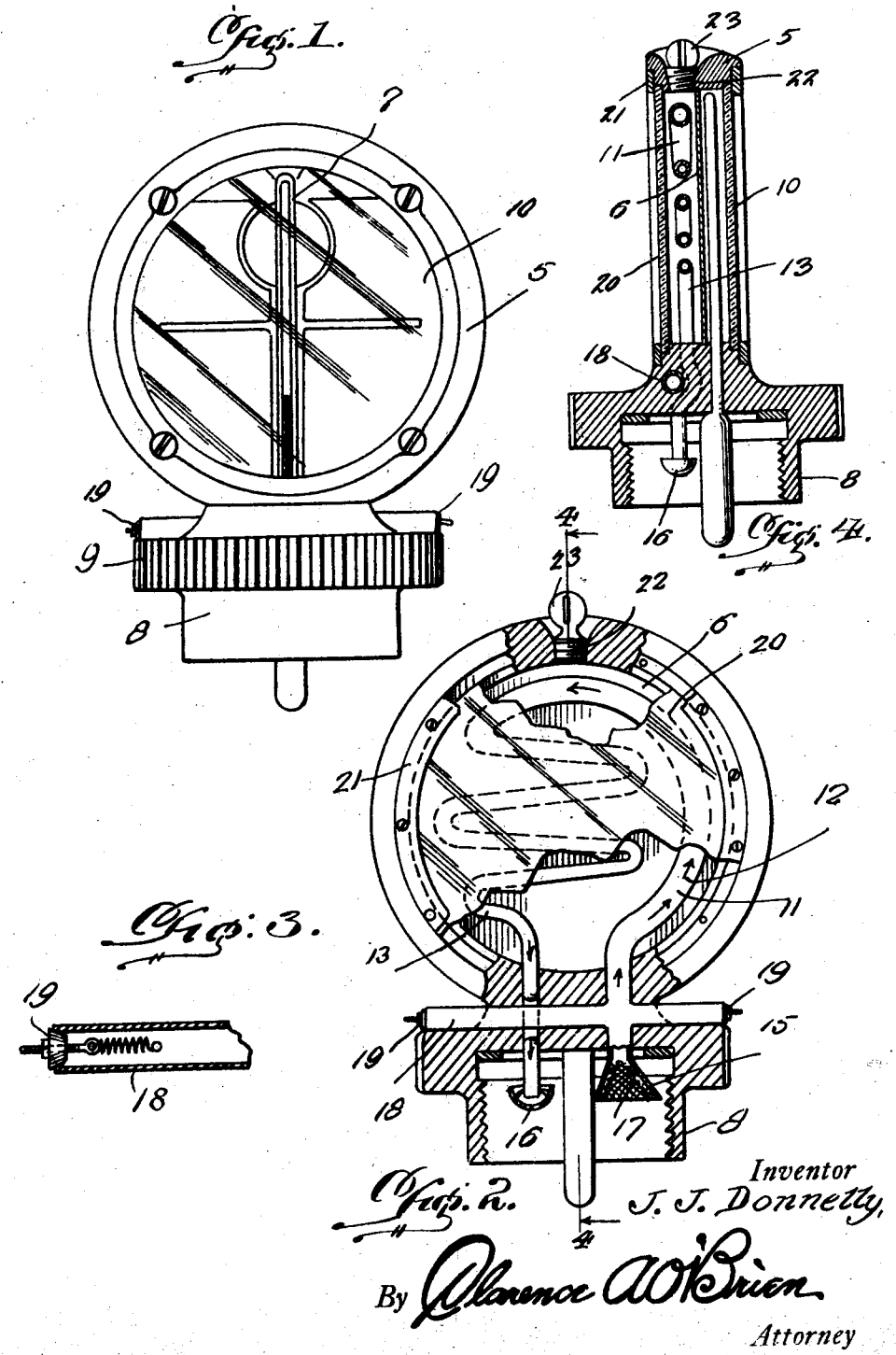
Inventor
J. J. Donnelly,
By Clarence A. O'Brien
Attorney Patented Jan. 11, 1927.

1,613,873

UNITED STATES PATENT OFFICE.

JAMES JOSEPH DONNELLY, OF ALEXANDRIA, SOUTH DAKOTA.

VAPOR CONDENSER FOR MOTOR VEHICLE RADIATORS.

Application filed March 3, 1926. Serial No. 91,992.

This invention relates to a vapor condenser for attachment to the usual filler neck of a motor vehicle radiator, and has for its primary object to provide a device that is incorporated within a conventional design of motor meter in order that the two units may be combined into one instrument and this without detracting from the appearance of the universally used motor meter.
An additional object of the invention is to provide an instrument wherein the same is so constructed as to present at its rear side a meter for determining the heat of the fluid within the radiator and at its forward side means for condensing the vapor of alcohol or other anti-freezing preparation thereby preventing the wastage of such anti-freezing solution which occurs when the vapor is permitted to escape to the atmosphere.

A further object is to provide such an instrument that is of a highly ornamental nature and that is well adapted for all of the purposes for which the same is intended.
Now having particular reference to the drawing:

Figure 1 is a rear elevation of an instrument constructed in accordance with the present invention.
Fig. 2 is a view partly in vertical cross section and partly in front elevation of the instrument.

Fig. 3 is an enlarged fragmentary longitudinal section of a horizontal vapor pipe included in the present invention, the opposite ends thereof being provided with pressure controlled valves for permitting the escape of the vapor should the pressure of the same within the engine reach a predetermined high degree, and Figure 4 is a central vertical section taken on line 4—4 of Figure 2.

Now having particular reference to the drawing, my novel instrument comprises a circular metallic case 5, having its sides closed by glass plates and provided with a central partition wall 6 for dividing the same into front and rear compartments. Within the rear compartment is a thermometer vial 7 arranged vertically at the center thereof, the lower end of which extends through the bottom edge of the casing and into a radiator filler neck attaching sleeve 8 that is formed upon or otherwise secured to the lower side of said casing as clearly shown in both Figs. 1 and 2. This sleeve is internally threaded for permitting the threaded engagement of the same with the usual externally threaded radiator filler neck while said sleeve is further provided with the usual knurled flange 9 for facilitating the turning of the sleeve onto or from said radiator filler neck.

Arranged upon the rear side of the casing 5 in front of the thermometer 7 is the usual protecting circular glass plate 10.

Arranged within the front compartment of the casing 5 is a vapor condensing coil 11 formed of a single length of piping as clearly shown in Fig. 2. This coil is so constructed as to provide a relatively C-shaped portion 12, and a zig-zag portion 13 at diametrically opposed sides of the casing, the C-shaped portion of the condensing coil being of greater cross sectional area than the portion of the piping forming the zig-zag portion 13.

The ends of the piping forming the coil pass through the casing 5 and enter the sleeve 8 also as shown in Fig. 2. The end of the C-shaped portion 12 is flared outwardly as at 15 to provide a receiving funnel for the vapors being discharged from the radiator while the end of the zig-zag portion of the pipe coil is equipped with a pan 16 in which condensate forms a liquid seal which prevents the entrance of the vapors into this end of the coil.

Arranged within the funnel end 15 is a screen 17 which will prevent the entrance of shale or other foreign matter into the coil. The reason for the variation in cross sectional area between the zig-zag portion and C-shaped portion of the coil is to permit of the ready passage of the vapors into and through said C-shaped portion but to restrict the passage of the vapors through the zig-zag portion resulting in the more efficient condensing of the vapors being discharged from the radiator.

Extending longitudinally across the attaching sleeve 8 above the knurled flange 9 is a horizontal pipe 18 that communicates with the condenser pipe adjacent the inlet end thereof, the opposite ends of this pipe being open and within which are arranged normally closed blow-off valves 19—19 preferably of the construction as shown in Fig. 3. The provision of these blow-off valves will allow the vapor to escape should the pressure of the same arise above a certain predetermined degree the construction of said valves being such as to permit of their regulation in order that they may be opened by various pressures of the vapor.

Arranged within this side of the casing 5 in front of the condensing coil is a circular glass plate 20, the edge of which rests within a rabbet formed in the casing as clearly shown in Fig. 2, said plate being secured in water-tight manner by reason of a conventional retaining ring 21.

Directly above the compartment containing the condensing coil is a threaded opening 22 within which is arranged a threaded plug 23, said opening being provided to permit the filling of the coil compartment with a cooling fluid such as water or the like, which will assist the air in maintaining the coil cold facilitating the entire condensation of the vapors passing therethrough.

It will thus be seen that I have provided a highly novel, simple and efficient form of vapor condenser, for vehicle radiators, that is so constructed as to efficiently combine with a more or less conventional type of motor meter in order that all of the objects and purposes heretofore set out will be completely attained.

Even though I have herein shown and described a specific form of my invention, it is nevertheless to be understood that minor changes may be made without affecting the spirit and scope of the invention as hereinafter claimed.

Having thus described my invention, what I claim as new and desire to secure by Letters Patent is:—

1. In an instrument of the character described, a casing, a sleeve upon the lower side of the casing to facilitate its association with a motor vehicle radiator filler neck, a condensing coil arranged within the casing and having its ends projecting therethrough and into said attaching sleeve, and means upon one end of said condenser for preventing the entrance of vapors into this end.

2. In a vapor condenser for motor vehicle radiators, a casing, an attaching sleeve formed upon the edge of the casing to facilitate the attachment thereof to a motor vehicle radiator filler neck, a condenser coil arranged within said casing, the opposite ends of said condensing coil extending through the casing into said attaching sleeve, means at one end of the coil for permitting the passage of the vapors therethrough, and means upon the opposite end of the coil for preventing the passage of the vapors therethrough.

3. In a vapor condenser for motor vehicle radiators, a casing, an attaching sleeve formed upon the edge of the casing to facilitate the attachment thereof to a motor vehicle radiator filler neck, a condenser coil arranged within said casing, the opposite ends of said condensing coil extending through the casing into said attaching sleeve, means at one end of the coil for permitting the passage of the vapors therethrough, means upon the opposite end of the coil for preventing the passage of the vapors therethrough, one side of said coil being of greater cross sectional area than the other side in order that the vapors passing through the enlarged side of the coil may have ready passage therethrough while the vapors in the other side of said coil will be restricted in their passage to facilitate the condensation of the same.

4. In a vapor condenser for motor vehicle radiators, a casing, an attaching sleeve formed upon the edge of the casing to facilitate the attachment thereof to a motor vehicle radiator filler neck, a condenser coil arranged within said casing, the opposite ends of said condensing coil extending through the casing into said attaching sleeve, means at one end of the coil for permitting the passage of the vapors therethrough, means upon the opposite end of the coil for preventing the passage of the vapors therethrough, closure walls for the opposite sides of the casing, and means for facilitating the entrance of cooling medium into said casing.

5. In a vapor condenser for motor vehicle radiators, a casing, an attaching sleeve formed upon the edge of the casing to facilitate the attachment thereof to a motor vehicle radiator filler neck, a condenser coil arranged within said casing, the opposite ends of said condensing coil extending through the casing into said attaching sleeve, means at one end of the coil for permitting the passage of the vapors therethrough, means upon the opposite end of the coil for preventing the passage of the vapors therethrough, and means for permitting the discharge of the vapors from the coil prior to condensation in the event the pressure reaches a certain predetermined degree.

6. In a vapor condenser for motor vehicle radiators, a casing, an attaching sleeve for facilitating the attachment of the casing to a motor vehicle radiator filler neck, a condensing coil arranged within the casing and having its ends projecting into the attaching sleeve, means upon one end of the condenser coil for preventing the entrance of vapors into this end, means on the other end of the coil for permitting the passage of vapors therethrough and additional means for permitting the discharge of the vapors from the coil prior to their condensation when the pressure reaches a predetermined degree, said last mentioned means comprising a laterally extending tube communicating with said coil adjacent the inlet end thereof, and blow off valves arranged in the respective ends of said lateral tube.

In testimony whereof I affix my signature.

JAMES JOSEPH DONNELLY.